United States Patent
Ufford et al.

(10) Patent No.: US 9,608,982 B2
(45) Date of Patent: Mar. 28, 2017

(54) IDENTITY VALIDATION SYSTEM AND ASSOCIATED METHODS

(71) Applicant: Trulioo Information Services Inc., Vancouver (CA)

(72) Inventors: Stephen Ufford, Vancouver (CA); Andrew Nash, San Francisco, CA (US)

(73) Assignee: Trulioo Information Services, Inc., Vancouver (CA)

( * ) Notice: Subject to any disclaimer, the term of this patent is extended or adjusted under 35 U.S.C. 154(b) by 0 days.

(21) Appl. No.: 14/252,122

(22) Filed: Apr. 14, 2014

(65) Prior Publication Data

US 2015/0295906 A1 Oct. 15, 2015

(51) Int. Cl.
*H04L 29/06* (2006.01)
*H04L 9/32* (2006.01)
*G06Q 20/40* (2012.01)

(52) U.S. Cl.
CPC ..... *H04L 63/0807* (2013.01); *G06Q 20/4014* (2013.01); *H04L 9/32* (2013.01); *H04L 63/0815* (2013.01)

(58) Field of Classification Search
CPC .... H04L 9/32; H04L 63/0815; G06Q 20/4014
See application file for complete search history.

(56) References Cited

U.S. PATENT DOCUMENTS

| | | | |
|---|---|---|---|
| 7,191,941 B1 * | 3/2007 | Mollett | G06Q 30/0601 235/381 |
| 7,627,895 B2 | 12/2009 | Gifford et al. | |
| 7,941,835 B2 | 5/2011 | Wolfond et al. | |
| 8,041,956 B1 * | 10/2011 | White | G06F 21/32 713/186 |
| 8,646,103 B2 | 2/2014 | Jakobson et al. | |
| 8,656,468 B2 | 2/2014 | Ponnath | |
| 2002/0004900 A1 | 1/2002 | Patel | |
| 2002/0083008 A1 * | 6/2002 | Smith et al. | 705/64 |

(Continued)

OTHER PUBLICATIONS

Bauer et al., "Minimal Information Disclosure with Efficiently Verifiable Credentials", 2008, pp. 15-24.*

(Continued)

*Primary Examiner* — Shawnchoy Rahman
*Assistant Examiner* — Thaddeus Plecha
(74) *Attorney, Agent, or Firm* — Mark Malek; William Harding; Widerman Malek, PL

(57) ABSTRACT

A computer system and associated methods for verifying user identities online. Identity claims made by a requestor of an online access and/or a trusted transaction may be verified by associating digital credentials to verified personal identification information (PII) retrieved from real world events. PII item(s) may be retrieved from third-party verified identity information sources. Verified personal attributes related to PII items may be identified and correlated with the requestor's digital credentials, and stored to a verified identity record. Additional digital credentials for the same requestor may be similarly identified, correlated, and stored to the verified identity record. A subsequent transaction request by a person claiming the requestor's identity may be compared with the verified identity record. An identity match indicator and/or a match confidence score may be created and used to determine the risk that the identity claim by the person requesting the transaction is false.

21 Claims, 7 Drawing Sheets

(56) References Cited

U.S. PATENT DOCUMENTS

| | | | | |
|---|---|---|---|---|
| 2003/0145223 A1* | 7/2003 | Brickell | ............... | G06F 21/33 726/10 |
| 2006/0188076 A1* | 8/2006 | Isenberg | ............ | H04M 3/385 379/88.02 |
| 2008/0289020 A1 | 11/2008 | Cameron et al. | | |
| 2010/0033739 A1 | 2/2010 | Phelan et al. | | |
| 2012/0185494 A1* | 7/2012 | Garmon | ............... | G06Q 30/02 707/758 |
| 2012/0215775 A1* | 8/2012 | Allen et al. | ................. | 707/728 |
| 2012/0311684 A1* | 12/2012 | Paulsen et al. | ................. | 726/6 |
| 2014/0032723 A1* | 1/2014 | Nema | .................. | G06Q 10/00 709/220 |
| 2014/0279544 A1* | 9/2014 | Baird | ................. | G06Q 20/322 705/44 |
| 2014/0372319 A1* | 12/2014 | Wolovitz | ............... | G06Q 30/06 705/71 |

OTHER PUBLICATIONS

The author is Wikipedia; the document is labeled Identity Correlation; the document was published Feb. 15, 2014;[Retrieved from the internet; https://en.wikipedia.org/w/index.php?title_correlation &oldid=595519697] (5 Pages).

Canadian Intellectual Property Office; Written Opinion of the ISA for related application PCT/IB2015/001328;dated Nov. 6, 2015 (5 Pages).

Canadian Intellectual. Property Office; PCT International Search Report for related application PCT/IB2015/001328; dated Nov. 6, 2015 (3 Pages).

World International Patent Office, "International Preliminary Report on Patentability", Oct. 18, 2016, for Patent Cooperative Treaty Application Serial No. PCT/IB2015/001328 filed Mar. 31, 2015. (6 Pages).

* cited by examiner

IDENTITY VALIDATION SYSTEM AND ASSOCIATED METHODS

FIELD OF THE INVENTION

The present invention relates to the field of online identification and, more specifically, to systems and methods for verifying identity claims made in an online environment.

BACKGROUND

The ability to identify online users has grown in importance as use of the worldwide web has evolved from mere sharing of unsecured information to processing of trusted data transactions. As the popularity of the Internet has grown over the past decades, so has the number of Internet services available supporting business-to-consumer and business-to-business transactions. Today's digital networks pose both an opportunity for physically dispersed parties to interact securely, and a risk that unwitting users may interact securely with untrustworthy parties.

These competing opportunities and risks create the design dilemma of establishing an effective level of identification practices online without creating a security regime that is too difficult or inconvenient for consumers to shop, bank online, request services, and access other restricted Internet content and features. If security measures are too lax, protected personal and business data may be put at risk of undesired disclosure. If security measures are too strict, customer frustration with a service provider's cumbersome web presence may lead to lost revenues.

Two areas of significant research in the art of trusted online environments are authentication and verification. For purposes of definition, the term "authentication" refers to systems and methods for controlling access to an online resource, particularly when the resource is configured to support access across an unsecured, public network. The term "verification," as used herein, refers to establishing the veracity of an identity claim (made either explicitly or impliedly) by a person who is requesting access to the online resource.

A common authentication technique is to require a requestor to input some combination of a username, a password, and/or responses to fact-based questions (such as a mother's maiden name) to form a request to access a given online resource. The requesting user may be granted access to the protected data and functions of the online resource only after an authentication service for the resource sends an access token in response to the access request. By contrast, verification protocols are typically implemented by presentation of a "digital credential," defined as a proof of qualification that is issued by a trusted source and attached to a person. Digital credentials may contain personal identifying information such as the person's name, birthplace, birthdate, and/or biometric information such as a picture or a finger print.

The digital networking industry is experiencing advancements in designs to securely process trusted transactions, some of which may be pertinent to certain aspects of verifying identities online.

U.S. Patent Application No. 2008/0289020 by Cameron discloses a method for receiving an identity token that includes a claim (such as identity) and a biometric representation that are bound by a digital signature. The veracity of the claim may be determined by comparing the biometric information to a second biometric representation received through a second channel. Although the Cameron implementation uses biometric information for authentication purposes, the security regime does not account for verification of identity to combat, for example, cases of tampering and/or identity theft.

U.S. Patent Application No. 2002/0004900 by Patel discloses secure anonymous communication between a first party and a second party using a third party (such as a registry) to identity the end user. The Patel implementation relies upon collection of and reliance upon information that is known to others (that is, the first party) and proactively transferred into the digital world for use in authentication. However, the disclosure does not address gleaning of unknown identifying information from sources outside the digital world.

U.S. Patent Application No. 2011/0099617 by Ponnath discloses a method of verifying authenticity of identity claims of communicating entities in an online transaction over a network. Identity information of the first communicating entity is extracted by the second communicating entity, and a client is prompted to provide a unique resource name of the first entity. Like the Patel disclosure, the Ponnath implementation assumes known identity information is already registered in a registry, and makes no attempt to glean unknown identifying information. Also, the registered information is concerned with identification of servers, not users.

A need exists for a security regime that gathers a knowledge base of real-time identifying information for users based not only on identifying events occurring in the digital environment, but also on identifying events happening in the real world. The knowledge base should be populated with correlations among authentication events, transaction events, and real world events. The security regime should be automated to support fast and reliable access to protected content and features. The solution should also empower relying parties in a trusted transaction to analyze the risk associated with an assessment of the veracity of an identity claim.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are directed to a systems and methods for verifying user identities online. More specifically, embodiments of the present invention are directed to networked computing systems and computer-implemented methods for establishing the identity and/or associated attributes and identity claims of a person by forming an association between verified information and digital credentials. The present invention may be configured to advantageously associate the authorization event to real world personal identification information (PII) to verify the identity claim by a requestor of online access and/or a trusted transaction. By so doing, embodiments of the present invention may advantageously exploit the online authentication event to establish the temporal and physical interaction with the person making the identity claim.

The identity verification system according to embodiments of the present invention may be configured as a computer program product that may include an identity evaluation subsystem that may be accessible from a communications network and that may be in data communication with a data store. The computer program product may implement a method for establishing identity of a person that may include the step of receiving access request data. The access request data may include a first digital credential related to an identity claim by the person.

The computer program product may include an identity information correlation subsystem that may implement a method to retrieve one or more personal identification information (PII) items related to the first digital credential, to identify at least one verified personal attribute related to some number of PII items, to correlate the verified personal attribute(s) with the first digital credential, and to store the correlated attribute to a verified identity record. The identity information correlation subsystem may retrieve the PII item(s) from one or more third-party verified identity information sources. Upon retrieval of multiple PII items, the identity information correlation subsystem may compare the PII items to each other, and may identify at least one verified personal attribute related to more than one of the PII items.

The computer program product may include a digital credential correlation subsystem that may implement a method to retrieve a second digital credential for the person related to a second identity claim. The identity information correlation subsystem may compare the second digital credential to the first digital credential, correlate the second digital credential with the first digital credential upon determination that the two credentials match, and store the correlated credential to the verified identity record.

The computer program product may implement a method for establishing identity of the person that may include the step of receiving transaction request data. The transaction request data may include a third digital credential related to a third identity claim by the person. The identity evaluation subsystem of the computer program product may further implement a method to compare the third identity claim of the person with the verified identity record, and to create an identity match indicator. The identity evaluation subsystem may determine the identify matching indicator based upon an attribute-only match between the third identity claim of the person and the verified identity record, or upon multiple-credential match between the third identity claim of the person and the verified identity record. The identity evaluation subsystem of the computer program product may further implement a method to create a match confidence score. The computer program product may implement a method for determining transaction risk based on the identity match indicator and/or the match confidence score.

DETAILED DESCRIPTION OF THE INVENTION

Figure 1:
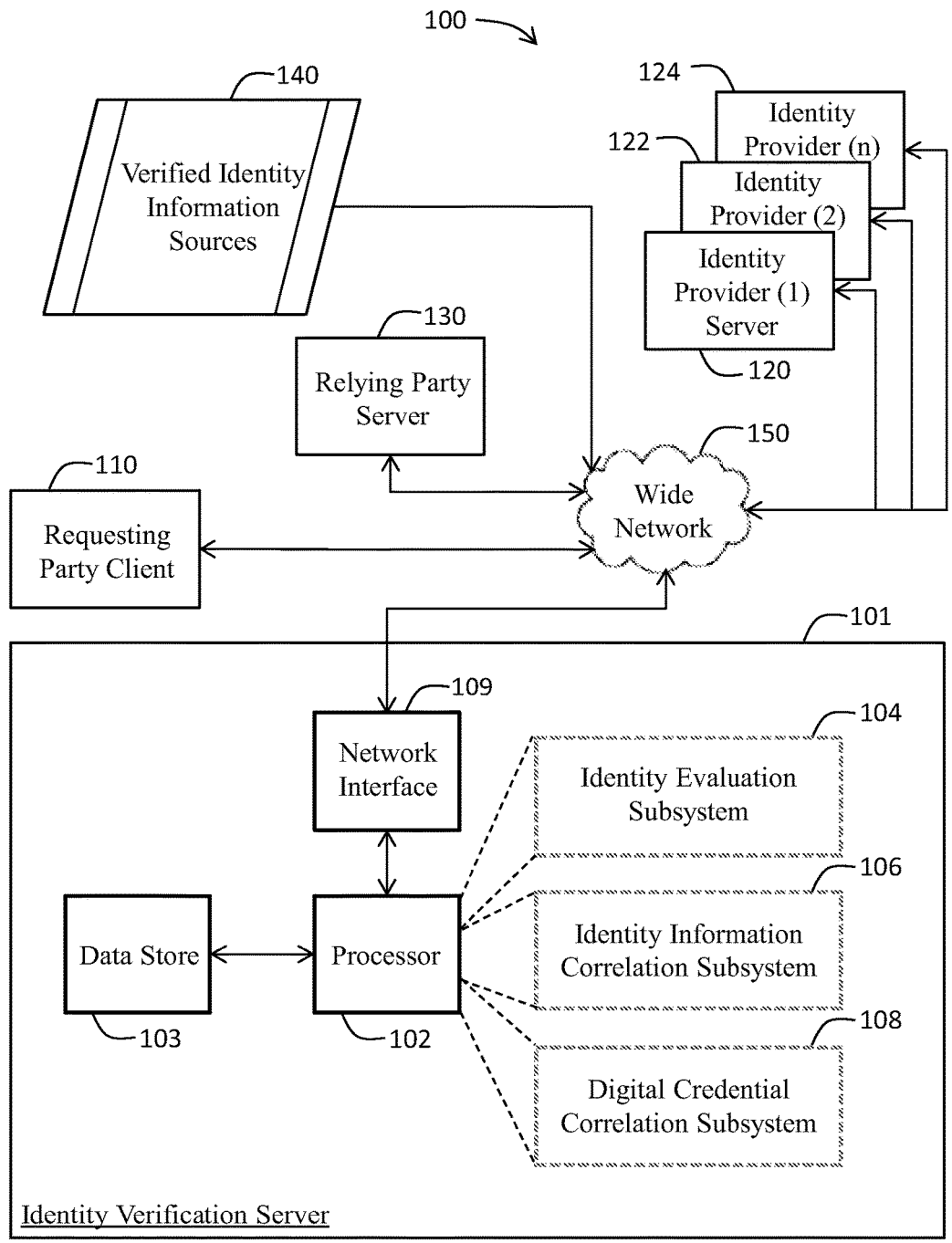
FIG. 1 is a schematic block diagram of an identity verification system according to an embodiment of the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

Referring to FIGS. 1-7, an identity verification system according to an embodiment of the present invention is now described in detail. Throughout this disclosure, the present invention may be referred to as an identification system, an online verification system, a verification system, a verification service, a verifier, a device, a system, a product, a service, and a method. Those skilled in the art will appreciate that this terminology is only illustrative and does not affect the scope of the invention. For instance, the present invention may just as easily relate to physical access control and computing forensics technology.

Example systems and methods for an identity verification system are described herein below. In the following description, for purposes of explanation, numerous specific details are set forth to provide a thorough understanding of example embodiments. It will be evident, however, to one of ordinary skill in the art that the present invention may be practiced without these specific details and/or with different combinations of the details than are given here. Thus, specific embodiments are given for the purpose of simplified explanation and not limitation.

Referring now to FIG. 1, an Identity Verification System 100 will now be discussed. For example, and without limitation, the Identity Verification System 100, according to an embodiment of the present invention, may include an Identity Verification Server 101, which may be in data communication with a Requesting Party Client 110, an Identity Provider Server 120, and a Relying Party Server 130. The Requesting Party Client 110, Identity Provider Server 120, and Relying Party Server 130 each may be coupled to the Identity Verification Server 101 using a wide area network 150 such as the Internet. The Identity Verification Server 101 also may have access to various third-party Verified Identity Information Sources 140 via the Internet 150.

For example, and without limitation, the Requesting Party Client 110 may comprise a web browser and a communication application. "Web browser" as used herein includes, but is not limited to, any application software or program (including mobile applications) designed to enable users to access online resources and conduct trusted transactions over a wide network such as the Internet. "Communication" as used herein includes, but is not limited to, electronic mail (email), instant messaging, mobile applications, personal digital assistant (PDA), a pager, a fax, a cellular telephone, a conventional telephone, television, video telephone conferencing display, other types of radio wave transmitter/transponders and other forms of electronic communication. Those skilled in the art will recognize that other forms of communication known in the art are within the spirit and scope of the present invention.

A typical user of a Requesting Party Client 110 may be a prospective consumer of protected data and/or functions made available by an online resource. A consumer may interact with various servers included in the Identity Verification System 100 through the Requesting Party Client 110. For example, and without limitation, consumers may include any individual seeking to connect with other online users using a social networking service. Also for example, and without limitation, consumers may include any individuals or companies desiring to conduct business transactions online using an e-commerce website.

The Relying Party Server 130 may comprise a web host configured for online transaction processing (OLTP). For example, and without limitation, services typically provided by a Relying Party Server 130 may include virtual storefronts, online marketplaces, demographic data gathering, electronic data interchange, online marketing, and secure business transactions. Such services typically manipulate content to which access is restricted, either by privacy policy (e.g., social networking websites) or by commercial necessity (e.g., e-commerce websites).

The Identity Provider Server 120 may include a web host configured to provide authentication services that secure data exchanges among multiple computer systems (for example, between the Requesting Party Client 110 and the Relying Party Server 130). For example, and without limitation, the identify provider server 120 may be queried to determine if an individual is authorized to perform a requested electronic transaction. Although such an authentication event may serve to establish a baseline level of confidence in a user identity claim electronically presented to the Identity Provider Server 120, subscription to a credential service provided by a trusted registration authority is commonly employed to verify an identity claim and, thereby, increase the level of confidence in the identity claim. Such a credential service provider (CSP) may employ the Identity Verification Server 101 for this purpose.

Continuing to refer to FIG. 1, the Identity Verification Server 101 may comprise a processor 102 that may accept and execute computerized instructions, and also a data store 103 which may store data and instructions used by the processor 102. More specifically, the processor 102 may be configured in data communication with some number of Identity Provider Servers 120, 122, 124, Relying Party Servers 130, and third-party Verified Identity Information Sources 140. The processor may be configured to direct input from other components of the Identity Verification System 100 to the data store 103 for storage and subsequent retrieval. For example, and without limitation, the processor 102 may be in data communication with external computing resources 120, 122, 124, 130, 140 through a direct connection and/or through a network connection 150 facilitated by a network interface 109.

Identity Evaluation Subsystem 104 instructions, Identity Information Correlation Subsystem 106 instructions, and Digital Credential Correlation Subsystem 108 instructions may be stored in the data store 103 and retrieved by the processor 102 for execution. The Identity Evaluation Subsystem 104 may advantageously receive and analyze access request data and/or transaction request data to establish temporal and physical interaction with requesting party (e.g., user) who is making an identity claim. The Identity Information Correlation Subsystem 106 may advantageously retrieve personal identification information (PII) about the user and associate verified personal attributes gleaned from the PII to a digital credential for the user. The Digital Credential Correlation Subsystem 108 may advantageously identify other digital credentials for the user, and may correlate matching credentials and their associated verified personal attributes so as to build a verified identity record that, over time, serves as increasingly reliable proof of the user's identity. The Identity Evaluation Subsystem 104 may advantageously respond to an authentication and/or transaction request with an indication of the veracity of the requestor's identity claim.

Those skilled in the art will appreciate, however, that the present invention contemplates the use of computer instructions that may perform any or all of the operations involved in identity verification, including access request and transaction request processing, authentication services, verification services, personal identification information collection and storage, and trusted transaction risk processing. The disclosure of computer instructions that include Identity Evaluation Subsystem 104 instructions, Identity Information Correlation Subsystem 106 instructions, and Digital Credential Correlation Subsystem 108 instructions is not meant to be limiting in any way. Those skilled in the art will readily appreciate that stored computer instructions may be configured in any way while still accomplishing the many goals, features and advantages according to the present invention.

Figure 2:
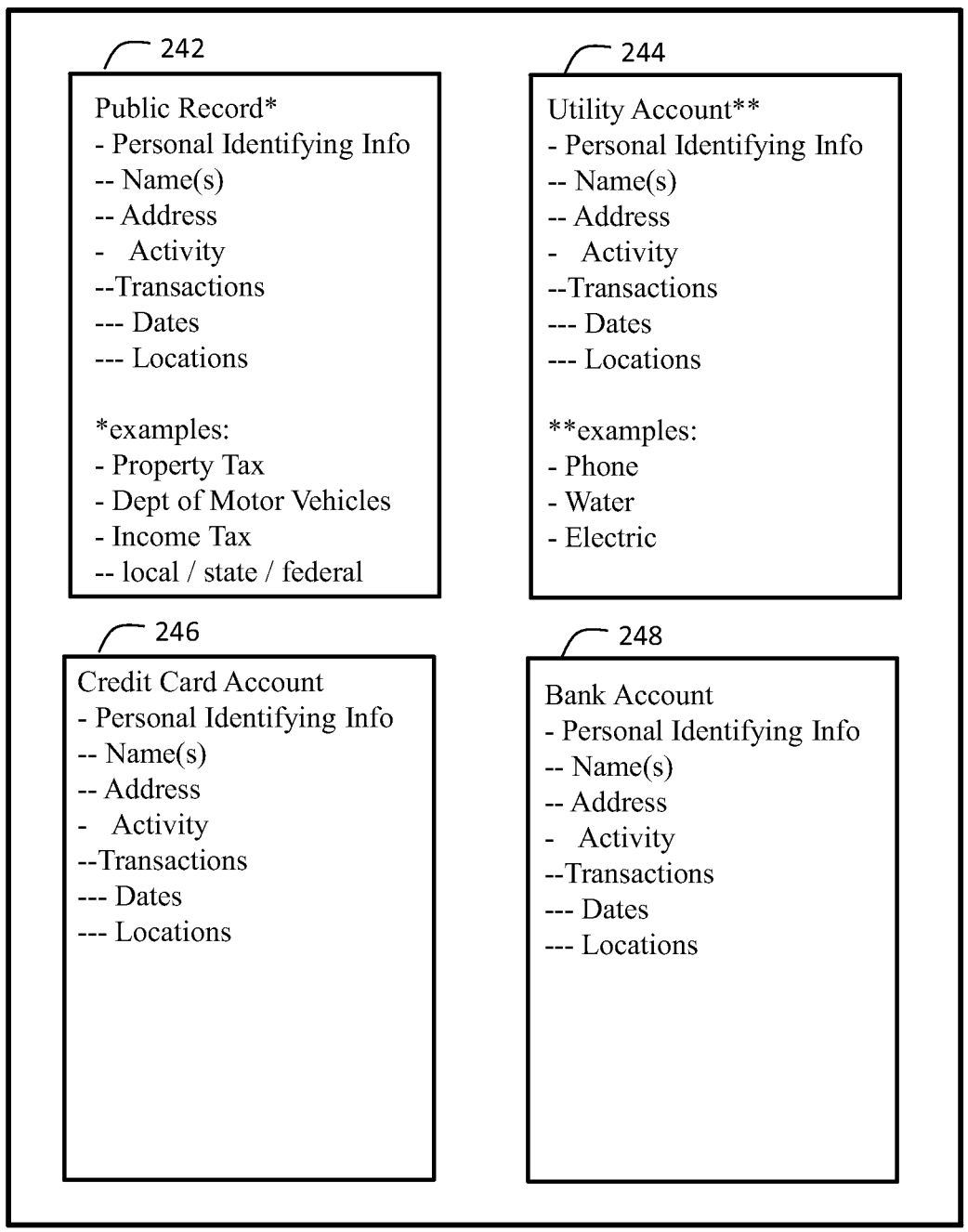
FIG. 2 is an illustration of exemplary data structures for verified identity information sources of the identity verification system depicted in FIG. 1.

Continuing to refer to FIG. 1, and referring additionally to FIG. 2, the Identity Verification Server 101 may retrieve real-time personal identification information (PII) about a person making an identity claim online, and may write to the data store 103 that information that is pertinent to a digital credential associated to the user. For example, and without limitation, the Identity Evaluation Subsystem 104 may receive access request data from an Identity Provider Server 120, and may extract one or more digital credentials for the user from that access request data. The Identity Information Correlation Subsystem 106, in turn, may obtain PII items from the Verified Identity Information Sources 140 that may either support or contradict the identity claim by the user. The embodiment of third-party Verified Identity Information Sources 140 illustrated in FIG. 2 shows example structures of data objects that may be pertinent to satisfying the identity verification requirements of a prospective relying host. Employment of networking may permit the Identity Information Correlation Subsystem 106 to retrieve PII from third-party information sources 140, thereby enhancing the timeliness and completeness of data used by the system 100. Although the embodiment of the invention discussed herein describes the data retrieval functionality performed by the Identity Information Correlation Subsystem 106, those skilled in the art will readily appreciate that stored computer instructions may be configured in any way while still accomplishing the many goals, features and advantages according to the present invention.

Continuing to refer to FIG. 2, for example, and without limitation, the data structure for a public record 242 will now be discussed. A public record may be defined as information that has been created or received by a state agency or local government in connection with the transaction of official business and preserved for informational value or as evidence of a transaction. Public information may comprise all records or documents required by law to be filed with or kept by a state agency or local government, including school districts. For example, and without limitation, public records may include property tax records, motor vehicle department records, and income tax records. Pertinent data included in public records may include a person's name and address.

Continuing to refer to FIG. 2, for example, and without limitation, the data structure for a utility account 244 will now be discussed. A utility account record may be defined as information that has been created or received by a provider of utility services to a particular address. Associations of a person's name with a particular address and with service transactions at that address over time may be of informational value for personal identification purposes. For example, and without limitation, utility account records of interest may include water service bills, electric service bills, and telephone service bills.

Continuing to refer to FIG. 2, for example, and without limitation, the data structure for a credit card account 246 will now be discussed. A credit card account record may be defined as information that has been created or received by a provider of credit card services to a particular person. Like utility accounts, credit card agreements associate a person's name and address with a particular account. Furthermore, credit card transactions such as purchases and payments may be of value in establishing the cardholder's ongoing daily activity, including physical presence on particular dates and times, for personal identification purposes.

Continuing to refer to FIG. 2, for example, and without limitation, the data structure for a bank account 248 will now be discussed. A bank account record may be defined as information that has been created or received by a provider of banking services to a particular person. Because of the fiduciary relationship between bankers and accountholders, banking institutions are particularly trusted service providers in terms of establishing identity credentials. Like utility accounts and credit card agreements, bank account records may establish associations between a person name, address, and account activity for personal identification purposes.

Although the data structures illustrated in FIG. 2 may be traditionally limited to systems that allow information retrieval only (commonly referred to in the art as "Web 1.0" sites), third-party information sources 140 accessed by the present invention may include systems that support user interaction and collaboration (commonly referred to in the art as "Web 2.0" sites). For example, and without limitation, an e-commerce merchant account may comprise records maintained and used for purposes similar to those illustrated for the bank account 248 described above. Also for example, and without limitation, an ad network account may comprise records configured to manage information created and maintained to deliver ad impressions purchased by an advertiser from a publisher of online content. Ad network account records may establish associations between each ad delivery participant's name, address, and account activity for personal identification purposes. As yet another example, and without limitation, a social network account may comprise records configured to enable users to communicate with each other by interactively retrieving and posting content. Social network account records may establish associations between communicating users' account setup variables and account activities for personal identification purposes.

Those skilled in the art will appreciate that the present invention contemplates the use of data structures that may store information supporting any or all of the operations involved in delivering authentication and verification services. The disclosure of the exemplary data structures above is not meant to be limiting in any way. Those skilled in the art will readily appreciate that data structures may include any number of additional or alternative real world data sources, and may be configured in any way while still accomplishing the many goals, features and advantages according to the present invention.

Figure 3:
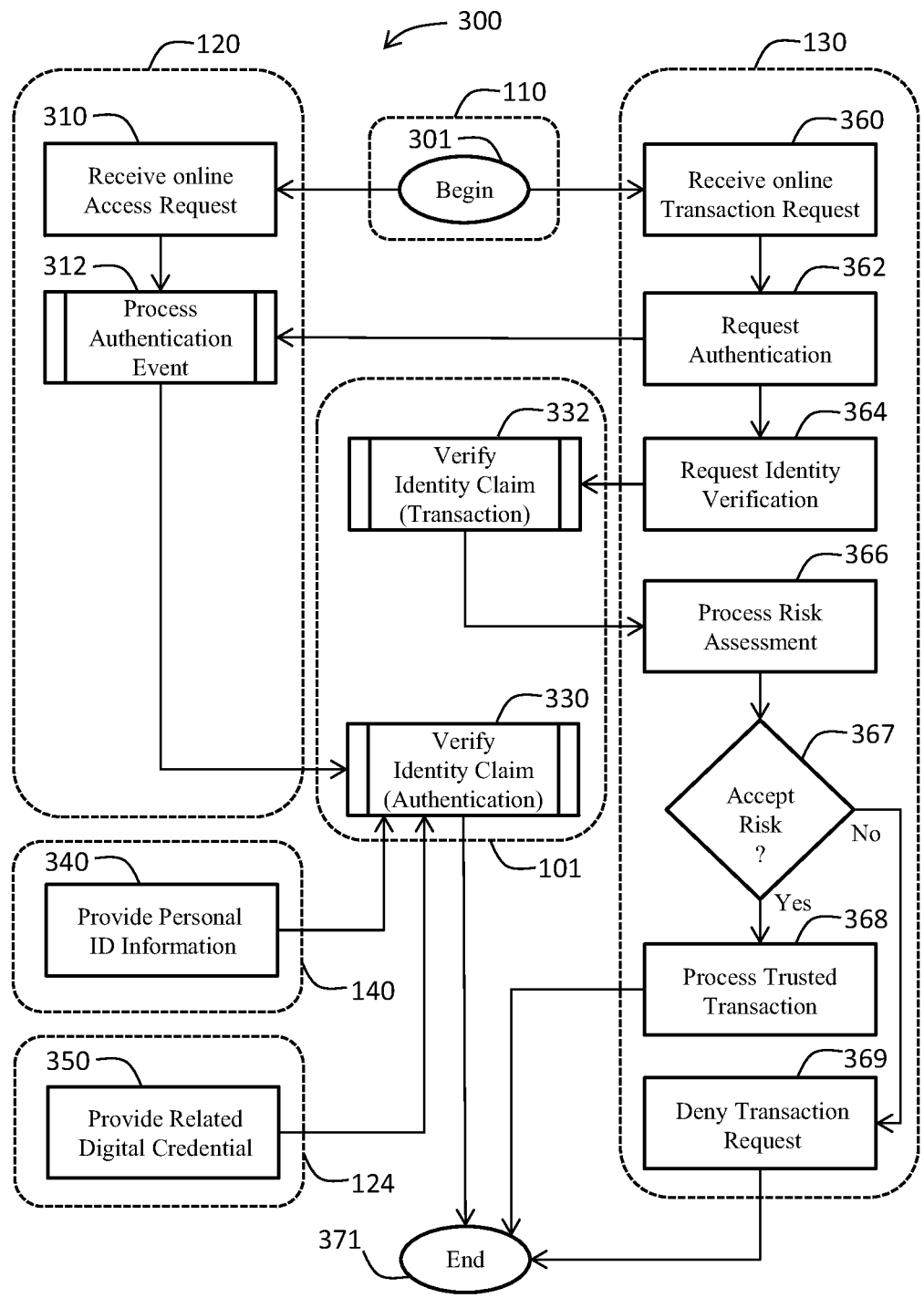
FIG. 3 is a flow chart detailing a method of operating an identity verification system according to an embodiment of the present invention.

Referring now to FIG. 3, and continuing to refer to FIGS. 1 and 2, a method aspect of creating and populating a verified identity record using the Identity Verification System 100, according to an embodiment of the present invention, is discussed. For example, and without limitation, an online user may interact with the Identity Provider Server 120 using the Requesting Party Client 110. More specifically, from the start at Block 301, the user may use a browser to develop an online access request and to transmit that request through the network 150 to the Identify Provider Server 120 (Block 310). For example, and without limitation, the online access request may include data such as a username, a password, and/or responses to fact-based questions (such as a mother's maiden name) to form the request to access the given online resource.

The online access request may be recognized by the Identity Provider Server 120 as an authentication event, and may process that event at Block 312 to determine if the requested access may be granted. To establish a higher level of confidence in the identity of the user requesting access, the Identity Provider Server 120 may submit data related to the authentication event to the Identity Verification Server 101 for verification of the user's identity claim (made either implicitly or explicitly as part of the authentication event). Alternatively, or in addition, the data related to an authentication event may be passed to the Identity Verification Server 101 for purposes of adding to the accumulated history of identifying actions taken online by the user. That accumulated history may be of informational value during future identity verification requests serviced by the Identity Verification Server 101.

Figure 4:
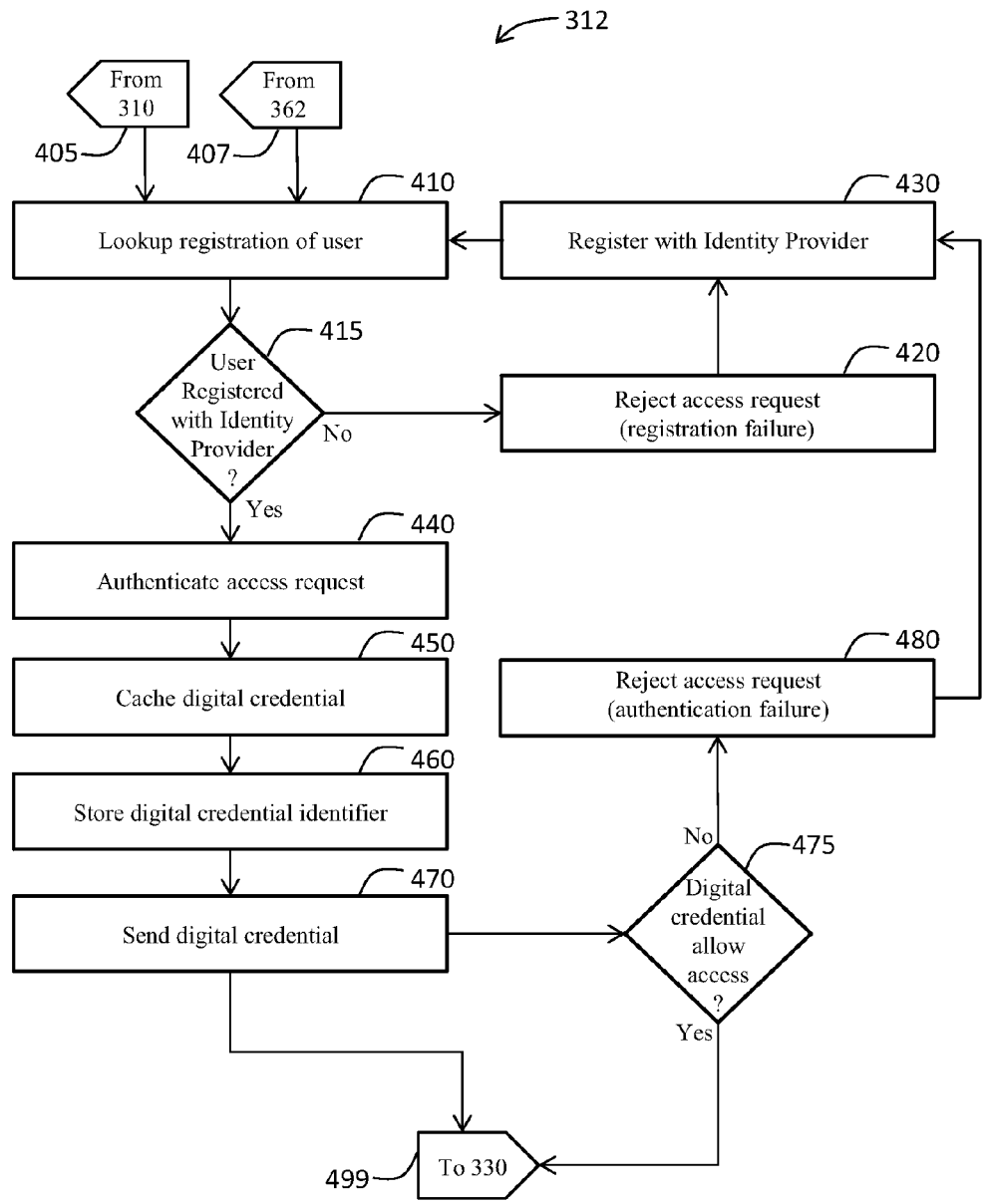
FIG. 4 is a flow chart detailing a method of authentication event processing as used in connection with an identity verification system according to an embodiment of the present invention.

Referring now to FIG. 4, and continuing to refer to FIG. 3, the process 312 of servicing an authentication request is discussed in greater detail. For example, and without limitation, the Identity Provider Server 120 may receive an authorization request from an online user (Block 405) and may perform a search to confirm that the user is registered to access the requested online content and/or features (Block 410). Registration information for the user may have been captured during a previous registration event (Block 430), during which the user may have been required to provide a real name or online nickname, age (or at least verification of being over some minimum required age for access), and other pieces of personal identifying information (PII) required (and likely vetted) by the business entity responsible for the Identity Provider Server 120 to fulfill service provision and legal obligations. Based on the information provided during registration (Block 430), the Identity Provider Server 120 may issue a token to be used by the registrant to fetch specific secure online resources without reentering a username, password, and/or responses to fact-based questions. Also, the Identity Provider Server 120 may create a digital credential binding the token to the PII of the user.

If, at Block 415, the information lookup does not confirm that the user is registered to access the requested online content and/or features, then the Identity Provider Server 120 may reject the access request (Block 420). Optionally, the Identity Provider Server 120 may prompt the rejected requestor to register for access (Block 430) and invite the user to subsequently submit another access request. If the information lookup confirms that the requestor is a registered user (Block 415), the Identity Provider Server 120 may securely authenticate the access request by accepting the user's token (Block 440). At Block 450, the Identity Provider Server 120 may use the token to retrieve some number of digital credentials created for the user during (and perhaps subsequent to) registration. The Identity Provider Server 120 may create a digital credential identifier as a tag for referring to the digital credential(s), and may store that digital credential identifier to facilitate later retrieval, update, and use of the digital credential information (Block 460).

If, at Block 475, a review of the digital credentials associated to a user's token does not confirm that the user is allowed to access the requested online content and/or features, then the Identity Provider Server 120 may reject the access request (Block 480). Optionally, the Identity Provider Server 120 may prompt the rejected requestor to register anew for access (Block 430) and invite the user to subsequently submit another access request. Whether or not the requested access is ultimately granted in response to the original authentication event, the Identify Provider Server 120 may transmit the digital credential(s) to other service providers and/or downstream systems (Block 470) for additional processing (Block 499).

Figure 5:
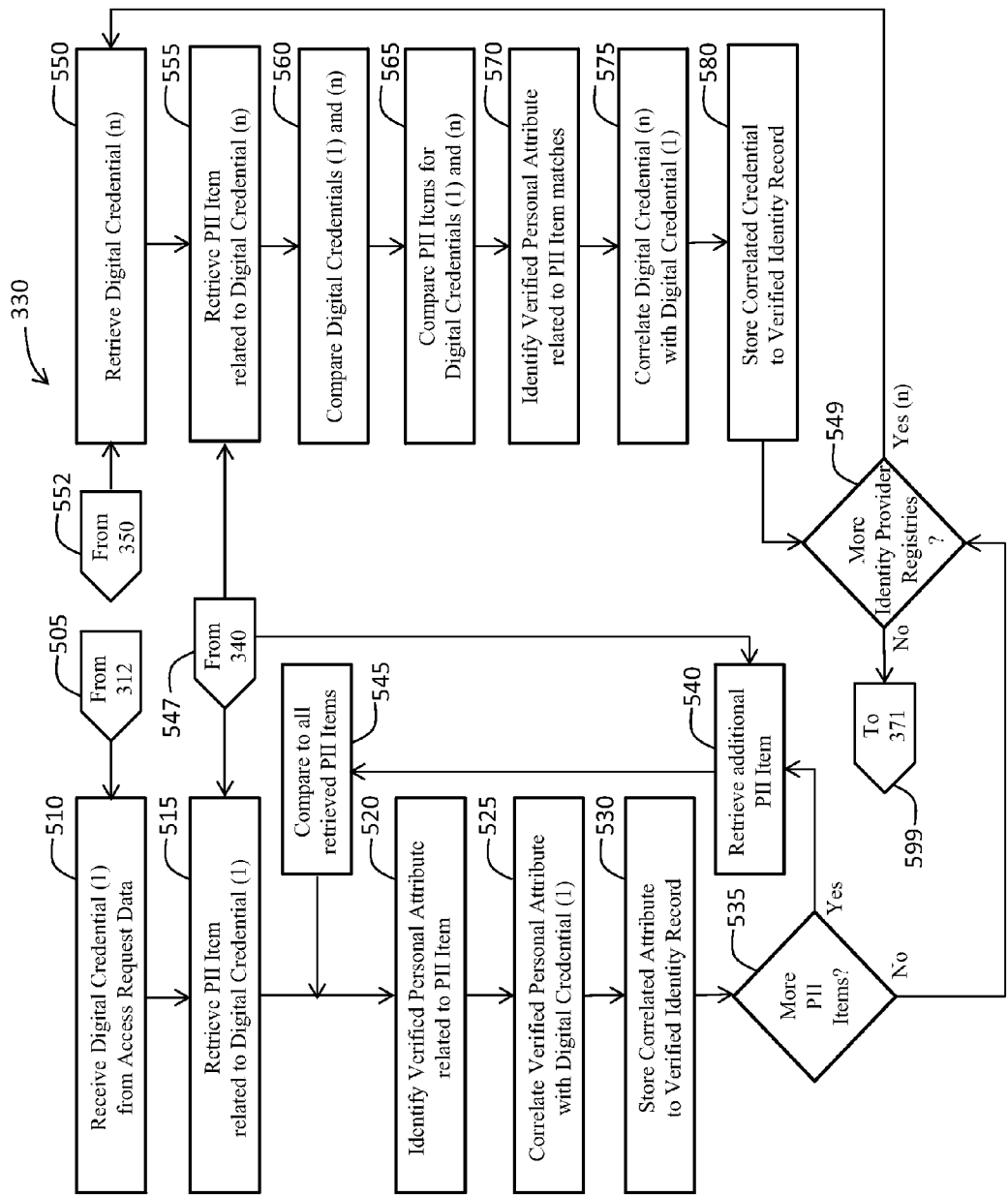
FIG. 5 is a flow chart detailing a method of authentication-driven identity verification as used in connection with an identity verification system according to an embodiment of the present invention.

Referring now to FIG. 5, and continuing to refer to FIG. 3, the process 330 of verifying a claim of identity arising from an authentication request is discussed in greater detail. For example, and without limitation, the Identity Evaluation Subsystem 104 of Identity Verification Server 101 may receive access request data (Block 510) sent by the Identity Provider Server 120 (Block 505). The access request data may comprise some number of digital credentials for a user seeking access to secure online resources.

At Block 515, the Identity Information Correlation Subsystem 106 of the Identity Verification Server 101 may use a digital credential parsed from the access request data as a key for retrieving personal identifying information (PII) from some number of Verified Identity Information Sources 140. For example, and without limitation, the Verified Identity Information Source 140 may comprise a bank account 248. At Block 340, an automated record system managed by the responsible banking institution may provide PII about an accountholder associated with the digital credential. The Identity Information Correlation Subsystem 106 may identify a verified personal attribute that may be established by the retrieved PII at Block 520.

A verified personal attribute may be defined as an identifying characteristic derived from, but not necessarily the original focus of, information collected about a person or thing. For example, and without limitation, a banking record retrieved as PII may include data regarding a deposit transaction, including a deposit amount and transaction date. The Identity Information Correlation Subsystem 106 may recognize the transaction date as being relatively recent, and may derive from that PII a verified personal attribute for the accountholder of being alive. At Block 525, the Identity Information Correlation Subsystem 106 may create a correlation between the derived verified personal attribute and the digital credential for the user, and may record that correlation to the data store 103 (Block 530) for subsequent retrieval, update, and processing.

At Block 535, the Identity Information Correlation Subsystem 106 may use the digital credential parsed from the access request data for a single authentication event as the key for retrieving personal identifying information (PII) from multiple and varied Verified Identity Information Sources 140 (Block 540). These PII may be compared to each other (Block 545) by the Identity Information Correlation Subsystem 106, and may result not only in the derivation of multiple verified personal attributes (Block 520), but also in updates to verified personal attribute previously identified. For example, and without limitation, Verified Identity Information Sources 140 queried regarding a person associated with the digital credential may comprise a utility account 244, a credit card account 246, and a bank account 248. The aggregation of data showing a credit card purchase, a utility bill payment, and a bank account deposit all occurring within the same week may be interpreted by the Identity Verification Server 101 that the person associated by the digital credential to all three sources 140 likely possesses the verified personal attribute of being alive.

At Block 549, the Digital Credential Correlation Subsystem 108 of the Identity Verification Server 101 may use the digital credential parsed from the access request data retrieved from the first Identity Provider 120 to identify other Identity Provider Servers 124 with whom the requestor may be registered. If no additional registries are detected, the process may end at Block 599. However, if additional registries are detected at Block 549, the Digital Credential Correlation Subsystem 108 may retrieve and analyze personal identifying information (PII) associated to additional digital credentials granted by the other Identity Provider Servers 124.

For example, and without limitation, at Block 550 the Digital Credential Correlation Subsystem 108 may use the digital credential as the key for retrieving related digital credentials from the other Identity Provider Servers 124 (Block 552). At Block 555, the Digital Credential Correlation Subsystem 108 may use the digital credential retrieved at Block 550 as the key for retrieving personal identifying information (PII) from some number of Verified Identity Information Sources 140 (Block 547). The Digital Credential Correlation Subsystem 108 may compare the original and retrieved digital credentials (Block 560), and may also compare respective PII items related to the original and retrieved digital credentials (Block 565). Based on these comparisons, at Block 570, the Digital Credential Correlation Subsystem 108 may identify additional verified personal attributes that may be established by PII item matches. To add to the identification history for the requestor, correlations between the original and retrieved digital credentials may be created (Block 575) and stored (Block 580) by the Digital Credential Correlation Subsystem 108. This retrieval, comparison, and correlation of digital credentials maintained by multiple Identity Provider Servers 124 may continue until no additional registries are detected, at which point the process may end at Block 599.

Referring again to FIG. 3, and continuing to refer to FIGS. 1 and 2, a method aspect of processing a trusted transaction request using the Identity Verification System 100, according to an embodiment of the present invention, is discussed. For example, and without limitation, an online user may interact with the Relying Party Server 130 using the Requesting Party Client 110. More specifically, from the start at Block 301, the user may use a browser to develop an online transaction request and to transmit that request through the network 150 to the Relying Party Server 130 (Block 360). The online transaction request may follow an online access request as described above in Block 310. For example, and without limitation, the online transaction request may include data such as a purchase request, payment account information, and/or a private information query to form the request to complete a trusted transaction involving the given online resource.

The online transaction request may be recognized by the Relying Party Server 130 first as an authentication event. At Block 362, the Relying Party Server 130 may request that an Identity Provider Server 120 process that event (Block 312) to determine if the requested access may be granted. As described above, the Identity Provider Server 120 may submit data related to the request by the Relying Party Server 130 for verification of the user's identity claim (made either implicitly or explicitly as part of the transaction request) by the Identity Verification Server 101. Alternatively, or in addition, the data related to the transaction request may be passed to the Identity Verification Server 101 for purposes of adding to the accumulated history of identifying actions taken online by the user.

Figure 6:
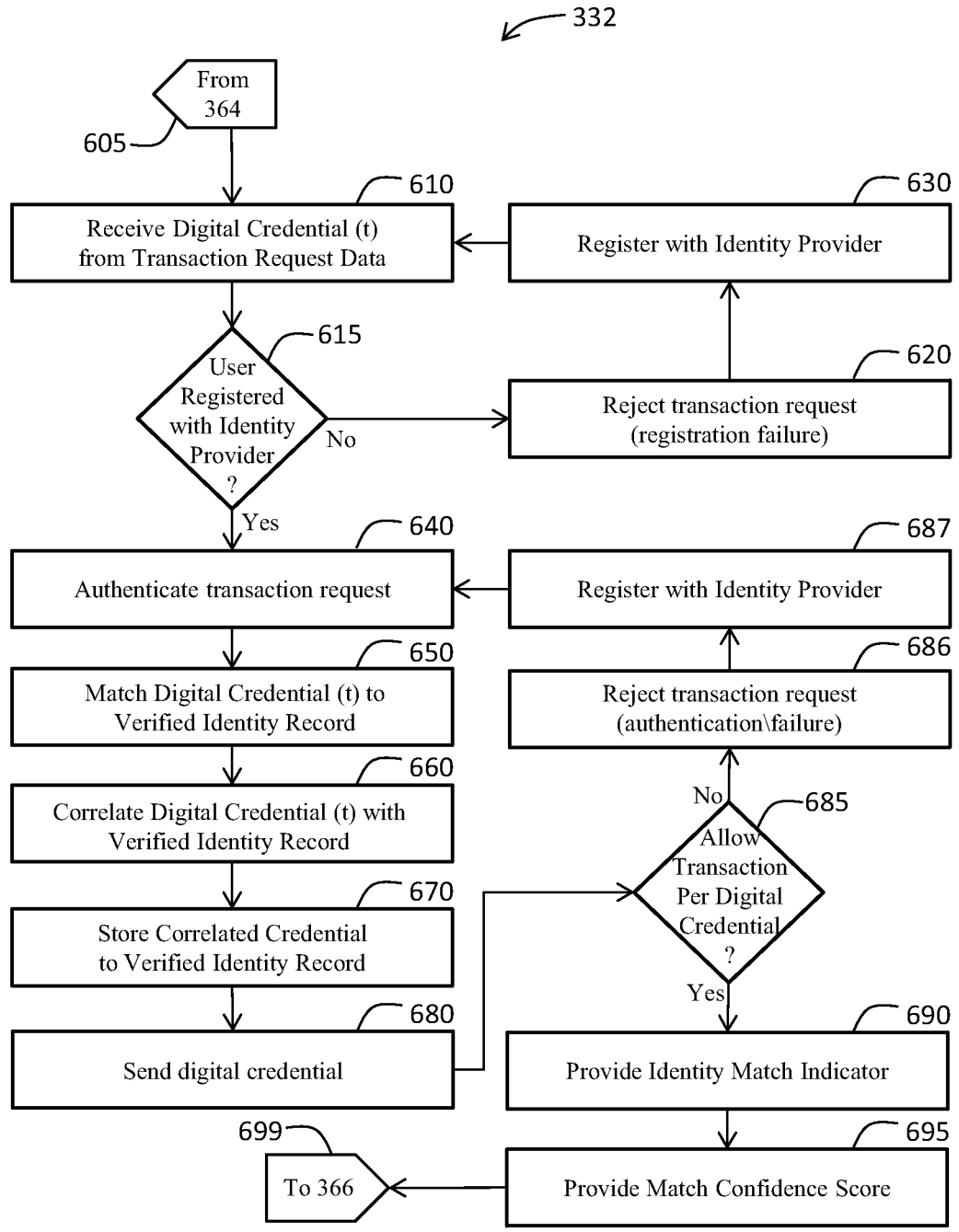
FIG. 6 is a flow chart detailing a method of transaction-driven identity verification as used in connection with an identity verification system according to an embodiment of the present invention.

Following a successful authentication, the Relying Party Server 130 may request identity verification in the context of the online transaction request. Referring now to FIG. 6, and continuing to refer to FIG. 3, the process 332 of servicing a verification request related to a trusted transaction is discussed in greater detail. For example, and without limitation, the Identity Evaluation Subsystem 104 may receive an digital credential for the user requesting the trusted transaction (Block 610) and may perform a search to confirm that the requestor is registered as a trusted user of the online content and/or features (Block 615).

If, at Block 615, the information lookup does not confirm that the user is registered as a trusted user of the requested online content and/or features, then the Identity Evaluation Subsystem 104 may reject the transaction request (Block 620). The Identity Evaluation Subsystem 104 may prompt the rejected requestor to register for as a trusted user (Block 630) and invite the user to subsequently submit another transaction request (Block 610). If the information lookup confirms that the requestor is a trusted user (Block 615), the Identity Evaluation Subsystem 104 may securely authenticate the transaction request by accepting the user's token (Block 640).

At Block 450, the Digital Credential Correlation Subsystem 108 of the Identity Verification Server 101 may search the data store 103 for verified identity records that match the digital credential submitted as part of the online transaction request (Block 650). At Block 660, the Digital Credential Correlation Subsystem 108 may create a correlation between the verified identity record and the digital credential for the transaction requestor, and may record that correlation to the data store 103 (Block 670) for subsequent retrieval, update, and processing.

If, at Block 685, a review of the digital credentials associated to a user's token does not confirm that the user is allowed to complete the requested transaction, then the Identity Evaluation Subsystem 104 may reject the access request (Block 686). The Identity Evaluation Subsystem 104 may prompt the rejected requestor to register anew for access (Block 687) and invite the user to subsequently submit another transaction request for authentication (Block 640). Whether or not the requested transaction is ultimately allowed at Block 685 in response to the original transaction request, the Identity Evaluation Subsystem 104 may transmit the digital credential to the Relying Party Server 130 (Block 680) for additional processing (Block 680). Optionally, the Identity Evaluation Subsystem 104 may analyze the verified identity record(s) correlated with the digital credential to compute an indicator of an identity match and/or a level of confidence in the identity match found. The Identity Evaluation Subsystem 104 may provide the identity match indicator (Block 690) and/or the identity confidence score (Block 695) to the Relying Party Server 130 for further processing (Block 699).

For example, and without limitation, and referring again to FIG. 3, the Relying Party Server 130 may process the identity match indicator and/or the identity confidence score to assess the risk of allowing the requested transaction to proceed (Block 366). If, at Block 367, the Relying Party Server 130 determines the risk of misidentification of the requestor to be acceptable, the Relying Party Server 130 may allow the trusted transaction (Block 368) before the process completes at Block 371. Conversely, if, at Block 367, the Relying Party Server 130 determines the risk of misidentification of the requestor to be unacceptably great, the Relying Party Server 130 may reject the trusted transaction (Block 369) before the process completes at Block 371. Although, in the embodiment illustrated in FIG. 3, the risk assessment and handling steps of Blocks 366, 367, 368, and 369 may be executed by the Relying Party Server 130, a person of ordinary skill in the art would immediately recognize that some or all of these steps may be carried out instead by the Identity Verification Server 101.

Figure 7:
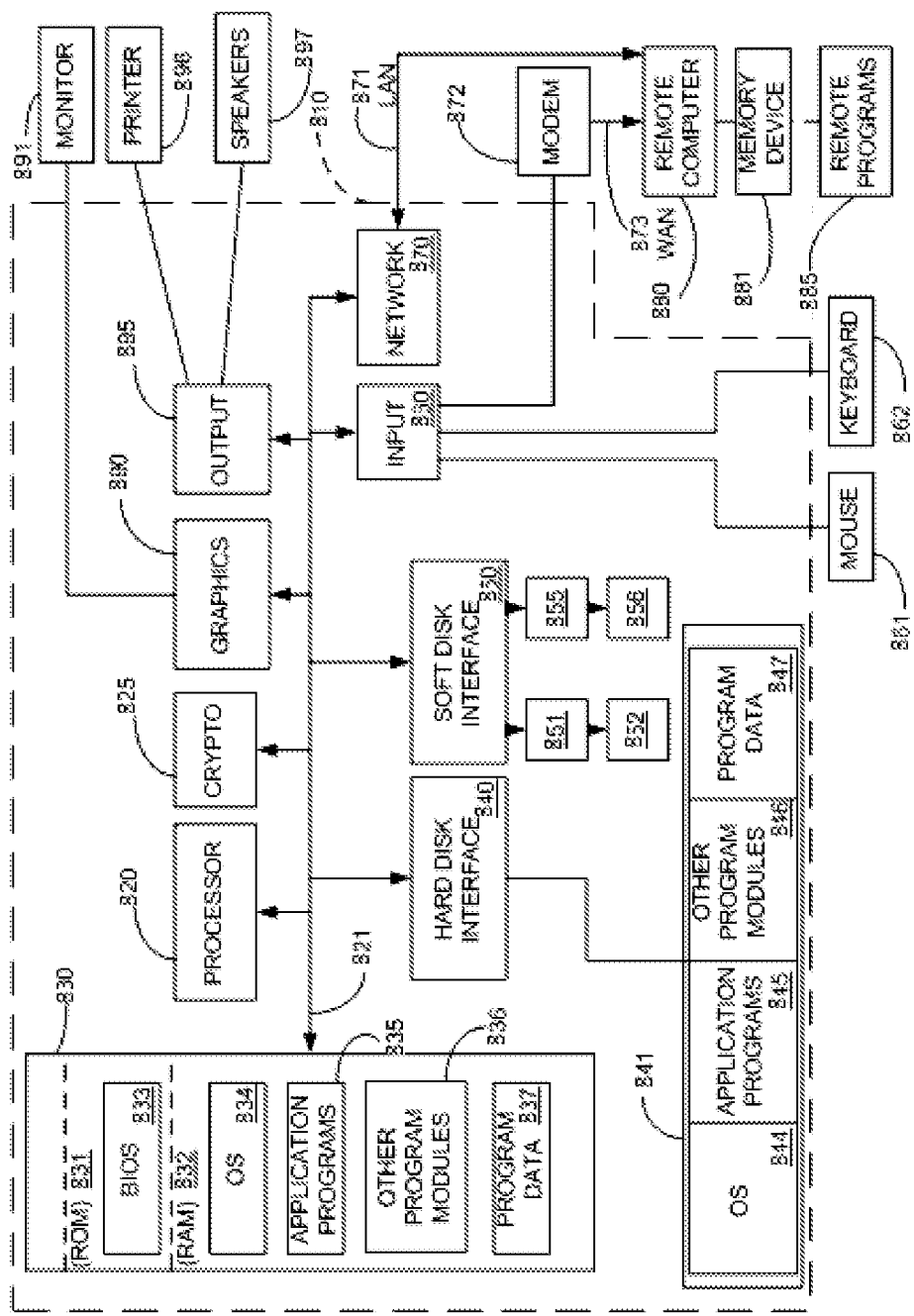
FIG. 7 is a block diagram representation of a machine in the example form of a computer system according to an embodiment of the present invention.

A skilled artisan will note that one or more of the aspects of the present invention may be performed on a computing device. The skilled artisan will also note that a computing device may be understood to be any device having a processor, memory unit, input, and output. This may include, but is not intended to be limited to, cellular phones, smart phones, tablet computers, laptop computers, desktop computers, personal digital assistants, etc. FIG. 7 illustrates a model computing device in the form of a computer 810, which is capable of performing one or more computer-implemented steps in practicing the method aspects of the present invention. Components of the computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI).

The computer 810 may also include a cryptographic unit 825. Briefly, the cryptographic unit 825 has a calculation function that may be used to verify digital signatures, calculate hashes, digitally sign hash values, and encrypt or decrypt data. The cryptographic unit 825 may also have a protected memory for storing keys and other secret data. In other embodiments, the functions of the cryptographic unit may be instantiated in software and run via the operating system.

A computer 810 typically includes a variety of computer readable media. Computer readable media can be any available media that can be accessed by a computer 810 and includes both volatile and nonvolatile media, removable and non-removable media. By way of example, and not limitation, computer readable media may include computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer 810. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 7 illustrates an operating system (OS) 834, application programs 835, other program modules 836, and program data 837.

The computer 810 may also include other removable/non-removable, volatile/nonvolatile computer storage media. By way of example only, FIG. 7 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives, and their associated computer storage media discussed above and illustrated in FIG. 7, provide storage of computer readable instructions, data structures, program modules and other data for the computer 810. In FIG. 7, for example, hard disk drive 841 is illustrated as storing an OS 844, application programs 845, other program modules 846, and program data 847. Note that these components can either be the same as or different from OS 833, application programs 833, other program modules 836, and program data 837. The OS 844, application programs 845, other program modules 846, and program data 847 are given different numbers here to illustrate that, at a minimum, they may be different copies. A user may enter commands and information into the computer 810 through input devices such as a keyboard 862 and cursor control device 861, commonly referred to as a mouse, trackball or touch pad. Other input devices (not shown) may include a microphone, joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a graphics controller 890. In addition to the monitor, computers may also include other peripheral output devices such as speakers 897 and printer 896, which may be connected through an output peripheral interface 895.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 7. The logical connections depicted in FIG. 7 include a local area network (LAN) 871 and a wide area network (WAN) 873, but may also include other networks 140. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 7 illustrates remote application programs 885 as residing on memory device 881.

The communications connections 870 and 872 allow the device to communicate with other devices. The communications connections 870 and 872 are an example of communication media. The communication media typically embodies computer readable instructions, data structures, program modules or other data in a modulated data signal such as a carrier wave or other transport mechanism and includes any information delivery media. A "modulated data signal" may be a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media may include both storage media and communication media.

Some of the illustrative aspects of the present invention may be advantageous in solving the problems herein described and other problems not discussed which are discoverable by a skilled artisan. While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

That which is claimed is:

1. A method for verifying an identity claim associated with an online access request, the access request for performing a transaction on a server, using an identity verification system comprising a computer processor and a non-transitory computer-readable storage medium accessible through the computer processor, wherein the non-transitory computer-readable storage medium comprises a plurality of instructions which, when executed by the computer processor, perform the method comprising:

receiving access request data related to the identity claim using an identity evaluation subsystem, wherein the access request data comprises a digital credential related to the identity claim;

performing operations, using an identity information correlation subsystem, comprising:

retrieving at least one personal identification information (PII) item related to the digital credential and characterized by a first focus;

deriving at least one verified personal attribute from the at least one PII item, wherein the at least one verified personal attribute is characterized by a second focus and wherein the second focus of the at least one verified personal attribute does not match the first focus of the at least one PII item;

correlating the at least one verified personal attribute with the digital credential to define a correlated attribute; and storing the correlated attribute to a verified identity record;

creating, using the identity evaluation subsystem, an identity match indicator;

transmitting, using the identity evaluation subsystem, the identity match indicator to the server; and verifying the identity claim, by the server, using the identity match indicator to allow or reject the access request.

2. The method according to claim 1 wherein the at least one PII item further comprises a plurality of PII items; wherein retrieving the at least one PII item further comprises retrieving the plurality of PII items related to the digital credential; wherein verifying the identity claim further comprises comparing the plurality of PII items to each other; and wherein deriving the at least one verified personal attribute further comprises deriving the at least one verified personal attribute from more than one of the plurality of PII items.

3. The method according to claim 2 wherein the digital credential defines a first digital credential; and further comprising adding to an accumulated history of identifying actions related to the identity claim using a digital credential correlation subsystem by:

retrieving, from the non-transitory computer-readable storage medium, a second digital credential related to a second identity claim;

comparing the second digital credential to the first digital credential;

correlating the second digital credential with the first digital credential to define a correlated credential upon determination of a match between the second digital credential and the first digital credential; and storing the correlated credential to the verified identity record.

4. The method according to claim 3 further comprising:

receiving transaction request data using the identity evaluation subsystem, wherein the transaction request data comprises a third digital credential related to a third identity claim; and comparing the third identity claim with the verified identity record;

wherein creating the identity match indicator further comprises determining an attribute-only match between the third identity claim and the verified identity record.

5. The method according to claim 4 further comprising creating a match confidence score upon determination of the attribute-only match.

6. The method according to claim 3 further comprising:
receiving transaction request data using the identity evaluation subsystem, wherein the transaction request data comprises a third digital credential related to a third identity claim; and
comparing the third identity claim with the verified identity record;
wherein creating the identity match indicator further comprises determining a multi-credential match between the third identity claim and the verified identity record.

7. The method according to claim 6 further comprising creating a match confidence score upon determination of the multi-credential match.

8. An identity verification system for verifying an identity claim associated with an online access request, the access request for performing a transaction on a server, comprising:
an identity evaluation subsystem accessible via a network and configured to receive access request data comprising a digital credential related to the identity claim;
an identity information correlation subsystem configured to:
retrieve at least one personal identification information (PII) item related to the digital credential and characterized by a first focus,
derive at least one verified personal attribute from the at least one PII item, wherein the at least one verified personal attribute is characterized by a second focus and wherein the second focus of the at least one verified personal attribute does not match the first focus of the at least one PII item,
correlate the at least one verified personal attribute with the digital credential to define a correlated attribute, and
store the correlated attribute to a verified identity record;
wherein the identity evaluation subsystem is further configured to create an identity match indicator and transmit the identity match indicator to the server; and
wherein the server is configured to verify the identity claim using the identity match indicator to allow or reject the access request.

9. The system according to claim 8 wherein the identity information correlation subsystem is further configured to retrieve the at least one PII item from a third-party verified identity information source.

10. The system according to claim 8 wherein the at least one PII item further comprises a plurality of PII items; wherein the identity information correlation subsystem is further configured to:
retrieve the plurality of PII items related to the digital credential;
compare the plurality of PII items to each other; and
derive the at least one verified personal attribute from more than one of the plurality of PII items.

11. The system according to claim 8 wherein the digital credential defines a first digital credential; wherein a digital credential correlation subsystem is further configured to:
retrieve a second digital credential related to a second identity claim;
compare the second digital credential to the first digital credential;
correlate the second digital credential with the first digital credential to define a correlated credential upon determination of a match between the second digital credential and the first digital credential; and
store the correlated credential to the verified identity record.

12. The system according to claim 11 wherein the identity evaluation subsystem is further configured to:
receive transaction request data comprising a third digital credential related to a third identity claim;
compare the third identity claim with the verified identity record; and
create the identity match indicator upon determination of an attribute-only match between the third identity claim and the verified identity record.

13. The system according to claim 12 wherein the identity evaluation subsystem is further configured to:
compare the third identity claim with the verified identity record; and
create the identity match indicator and a match confidence score upon determination of a multiple-credential match between the third identity claim and the verified identity record.

14. A computer-implemented method for verifying an identity claim associated with an online access request, the access request for performing a transaction on a server, using an identity verification system, the method comprising:
receiving access request data comprising a digital credential related to the identity claim;
retrieving at least one personal identification information (PII) item related to the digital credential and characterized by a first focus;
deriving at least one verified personal attribute from the at least one PII item, wherein the at least one verified personal attribute is characterized by a second focus and wherein the second focus of the at least one verified personal attribute does not match the first focus of the at least one PII item;
correlating the at least one verified personal attribute with the digital credential to define a correlated attribute;
storing the correlated attribute to a verified identity record;
creating an identity match indicator;
transmitting the identity match indicator to the server; and
verifying the identity claim, by the server, using the identity match indicator to allow or reject the access request.

15. The method according to claim 14 wherein the at least one PII item further comprises a plurality of PII items; wherein retrieving the at least one PII item further comprises retrieving the plurality of PII items related to the digital credential; wherein verifying the identity claim further comprises comparing the plurality of PII items to each other; and wherein deriving the at least one verified personal attribute further comprises deriving the at least one verified personal attribute from more than one of the plurality of PII items.

16. The method according to claim 15 wherein the digital credential defines a first digital credential; and further comprising adding to an accumulated history of identifying actions related to the identity claim by:
retrieving a second digital credential related to a second identity claim;
comparing the second digital credential to the first digital credential;
correlating the second digital credential with the first digital credential to define a correlated credential upon determination of a match between the second digital credential and the first digital credential; and
storing the correlated credential to the verified identity record.

17. The method according to claim 16 further comprising:
receiving transaction request data comprising a third digital credential related to a third identity claim; and
comparing the third identity claim with the verified identity record;
wherein creating the identity match indicator further comprises determining an attribute-only match between the third identity claim and the verified identity record.

18. The method according to claim 17 further comprising creating a match confidence score upon determination of the attribute-only match.

19. The method according to claim 16 further comprising:
receiving transaction request data comprising a third digital credential related to a third identity claim; and
comparing the third identity claim with the verified identity record;
wherein creating the identity match indicator further comprises determining a multi-credential match between the third identity claim and the verified identity record.

20. The method according to claim 19 further comprising creating a match confidence score upon determination of the multi-credential match.

21. The method according to claim 20 further comprising determining transaction risk based on at least one of the identity match indicator and the match confidence score.

\* \* \* \* \*